(12) United States Patent
Mabry et al.

(10) Patent No.: US 12,515,814 B2
(45) Date of Patent: Jan. 6, 2026

(54) AUTOMATED TEST CARDS FOR PERFORMING IN-FLIGHT TESTING ON AIRCRAFT, AND ASSOCIATED SYSTEMS AND METHODS

(71) Applicant: BOOM TECHNOLOGY, INC., Centennial, CO (US)

(72) Inventors: Jeffrey Mabry, Castle Rock, CO (US); David Hunter, Lone Tree, CO (US); Eric Dowty, Lakewood, CO (US)

(73) Assignee: Boom Technology, Inc., Centennial, CO (US)

( * ) Notice: Subject to any disclaimer, the term of this patent is extended or adjusted under 35 U.S.C. 154(b) by 0 days.

(21) Appl. No.: 17/959,987

(22) Filed: Oct. 4, 2022

(65) Prior Publication Data

US 2023/0104383 A1    Apr. 6, 2023

Related U.S. Application Data

(60) Provisional application No. 63/252,411, filed on Oct. 5, 2021.

(51) Int. Cl.
*B64F 5/60*     (2017.01)
*G01M 17/00*   (2006.01)
*G07C 5/08*    (2006.01)

(52) U.S. Cl.
CPC .............. *B64F 5/60* (2017.01); *G07C 5/0808* (2013.01); *G07C 5/0825* (2013.01); *G07C 5/085* (2013.01)

(58) Field of Classification Search
CPC ....... B64F 5/60; G07C 5/0808; G07C 5/0825; G07C 5/085; G01M 17/00

(Continued)

(56) References Cited

U.S. PATENT DOCUMENTS

| | | | |
|---|---|---|---|
| 5,023,791 A | * | 6/1991 | Herzberg ........... G05B 23/0283 324/73.1 |
| 9,563,580 B2 | | 2/2017 | Warner et al. |

(Continued)

FOREIGN PATENT DOCUMENTS

| | | |
|---|---|---|
| JP | 2019108117 | 7/2019 |
| WO | 2021133543 | 7/2021 |

OTHER PUBLICATIONS

Author USAF Edwards Air Force Instruction 99-105 Sep. 13, 2019 (Year: 2019).*

(Continued)

*Primary Examiner* — Tyler D Paige
(74) *Attorney, Agent, or Firm* — Perkins Coie LLP

(57) ABSTRACT

Methods and systems for testing an aircraft in-flight are described herein. The method can include receiving a test deck including one or more test cards, with an individual test card including an ordered list of points. For an individual test card, points of the ordered list of points can be performed, a status for the performed points of the ordered list of points can be assigned, a current fuel value for the aircraft can be received, and the current fuel value can be compared to an expected amount of fuel required to perform the remaining test cards. In response to the comparison indicating that the current fuel value is not sufficient for the remaining test cards, the method can include modifying the test deck at least until the current fuel value is sufficient for executing a subset of remaining test cards.

23 Claims, 9 Drawing Sheets

(58) Field of Classification Search
USPC .................................................... 701/29.1
See application file for complete search history.

(56) References Cited

U.S. PATENT DOCUMENTS

| | | | |
|---|---|---|---|
| 9,664,530 B2 | 5/2017 | Carr et al. | |
| 9,998,805 B2 | 6/2018 | Friel et al. | |
| 2007/0032922 A1 | 2/2007 | Gvillo | |
| 2007/0142980 A1* | 6/2007 | Ausman | G01D 7/00 |
| | | | 701/3 |
| 2010/0044515 A1 | 2/2010 | Neto | |
| 2010/0312420 A1* | 12/2010 | Sham | G06Q 10/00 |
| | | | 701/3 |
| 2011/0043369 A1 | 2/2011 | Knoop | |
| 2011/0050244 A1* | 3/2011 | Knoop | G05B 23/0256 |
| | | | 324/503 |
| 2013/0166135 A1* | 6/2013 | Dunsdon | G07C 5/0808 |
| | | | 701/29.3 |
| 2017/0006135 A1 | 1/2017 | Siebel et al. | |
| 2017/0019309 A1 | 1/2017 | Mason | |
| 2019/0129404 A1 | 5/2019 | Cella et al. | |
| 2019/0251051 A1* | 8/2019 | Warner | G06F 13/20 |
| 2020/0047913 A1* | 2/2020 | Shavit | B64D 45/00 |
| 2020/0374889 A1 | 11/2020 | Kalhan et al. | |
| 2021/0181722 A1 | 6/2021 | Tan et al. | |
| 2023/0104383 A1* | 4/2023 | Mabry | G07C 5/0808 |
| | | | 701/29.1 |

OTHER PUBLICATIONS

AeroTEC—Testing, Engineering, Certification website: Customized Software, https://www.aerotec.com/software/, copyright 2020, 3 pages.

International Search Report and Written Opinion for International Patent Application No. PCT/US22/45689, Applicant: Boom Technology, Inc., mailed Feb. 17, 2023, 8 pages.

Dauer et al., "Flight Testing of an Unmanned Aircraft System—A Research Perspective," STO Meeting Proceedings STO-MP-SCI-269, 2015, 28 pages.

* cited by examiner

AUTOMATED TEST CARDS FOR PERFORMING IN-FLIGHT TESTING ON AIRCRAFT, AND ASSOCIATED SYSTEMS AND METHODS

CROSS-REFERENCE TO RELATED APPLICATION(S)

The present application claims priority to U.S. Provisional Patent Application No. 63/252,411, filed Oct. 5, 2021, which is incorporated herein by reference in its entirety.

TECHNICAL FIELD

The present technology is directed generally to flight test systems and methods for aircraft.

BACKGROUND

New aircraft designs undergo testing to ensure the aircraft meets safety standards. Testing can include tests of individual components of the aircraft while in production or immediately after production, on the aircraft as a whole while the aircraft is on the ground, and/or while the aircraft is in-flight, to ensure all components and systems of the aircraft work safely as intended.

In-flight aircraft tests can include performing maneuvers, operations, and/or other actions to test various systems and components of the aircraft. For example, an operator (e.g., a pilot) can follow pre-planned flight patterns, which can include maneuvers that test navigation equipment, components such as flaps, rudders, sensors, and other devices, and various systems of the aircraft, such as auto-pilot systems, navigation systems, aircraft instruments, and the like.

Every action for in-flight tests is time-critical. It is also critical for an operator to give attention to safely operating the aircraft and diligently carrying out the test plan. The time an operator spends focused on performing calculations (e.g., fuel calculations) or changing the test plan is time spent burning fuel and/or being distracted from information relevant to carrying out a safe flight and/or observing results of a test (e.g., data from flight instruments, flight telemetry information, etc.). Accordingly, existing methods of aircraft testing can be inefficient, and therefore, there remains a need for improved test systems and methods. Embodiments of the present technology are directed to this need and the foregoing challenges, and to other needs and challenges.

BRIEF DESCRIPTION OF THE DRAWINGS

In the drawings, wherein the same reference number indicates the same element throughout the views.

Figure 1A:
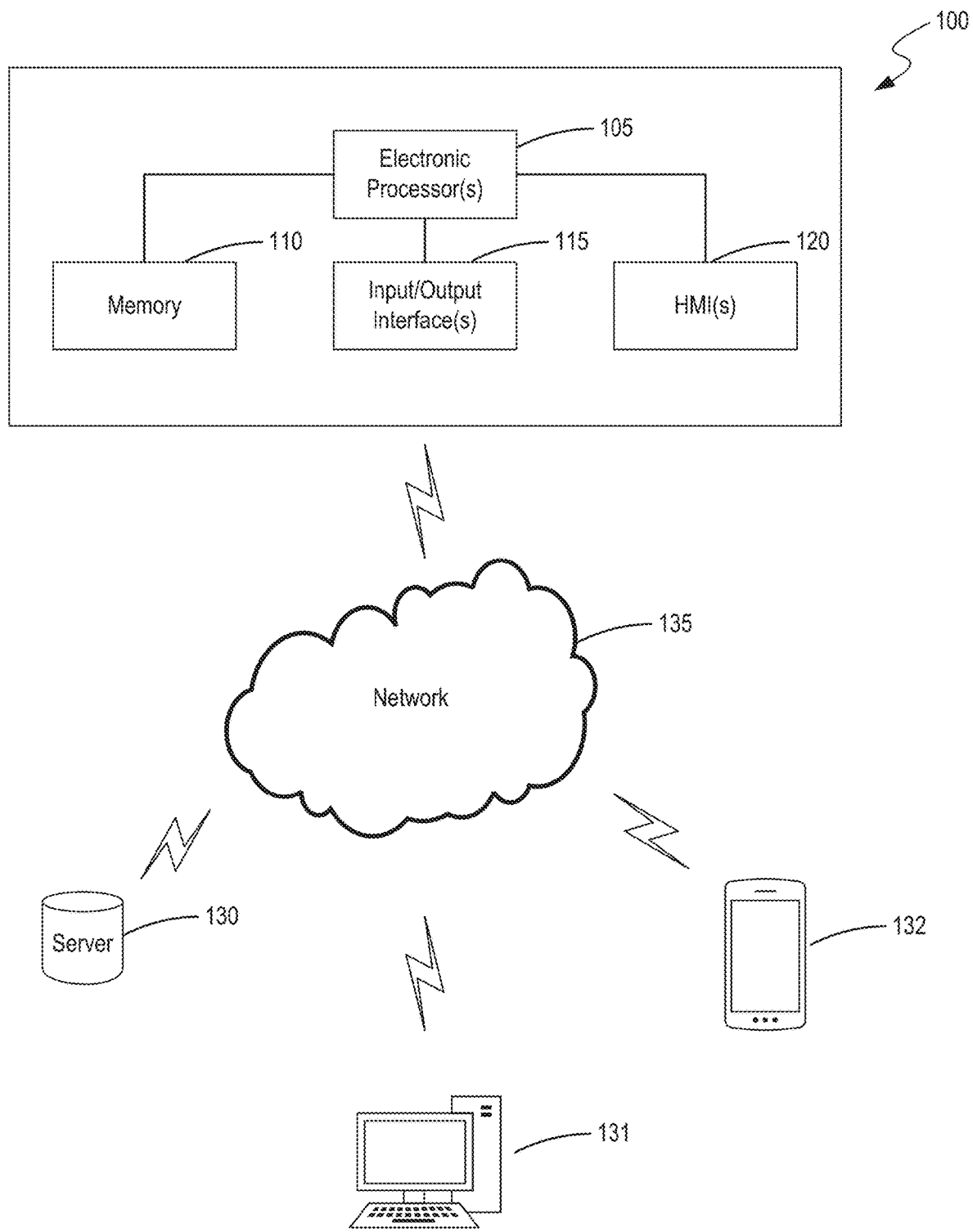
FIG. 1A illustrates a representative computing system on which a flight test card service can operate, in accordance with some embodiments of the present technology.

The systems and methods introduced in this disclosure can be better understood by referring to the following Detailed Description in conjunction with the accompanying drawings.

DETAILED DESCRIPTION

Flight test card services configured to aid performance of in-flight testing for aircraft designs, and associated methods, are disclosed herein. A representative flight test card service can include a process, a software application, a web-based application, a system configured to carry out a process and/or application, and/or a controller programmed with instructions to carry out such a process, and corresponding input/output devices, etc. Aspects of embodiments of flight test card services are described below under various headings for the reader's convenience. The headings are not intended to segregate aspects or concepts from each other. Rather, any feature under one heading can be implemented in conjunction with features under other headings.

Overview and Introduction to Flight Test Card Services

A flight test card service can manage a set of flight test events (e.g., flight activities that an operator wants to test). The set of flight test events can be referred to as a test "deck." Each test event can include a group and/or sequence of test points (e.g., settings, actions, etc.) to be performed and/or met to perform the overall test event. The group and/or sequence of test points can be referred to as a "card" in the "deck." Accordingly, the term "card" herein can refer to a database of information (the information can include test points), and the term "deck" can refer to a collection of cards/databases.

In some embodiments, test points in a card, and test cards in a deck, can include configurations for the test (e.g., initial configurations), conditions for the test (e.g., initial conditions), limits to aspects of the test, and/or a list of actions (e.g., an ordered list of actions such as a procedural checklist) for an operator to follow to complete the test event. In a more specific, non-limiting example, initial configurations can include various settings for aircraft components (e.g., landing gear up or down, flap settings, and the like), and initial conditions can include operating parameters of the aircraft at the beginning of a test (e.g., airspeed, angle of attack, attitude, flying altitude, bank angle, and the like). In some embodiments, the initial conditions and/or configurations must be met before the activities of the test card can be executed. A list of activities can include maneuvers for an operator to perform (e.g., runup, climb, bank, etc.). During operation, a telemetry system records data to analyze the aircraft to gather test information.

To execute a test card selected from a test deck, one or more operators (e.g., one or more pilots, crewmembers, engineers, autonomous control systems, remote control systems, and/or other operators) can initiate the configurations and/or conditions, and can perform the list of actions. In some embodiments, an action can include recording observations related to test actions (e.g., by an operator inputting an observation into the service using an input device, and/or automatically via telemetry). The system and/or process can assign a status to each point/action, such as a status representative of data quality and/or an outcome of the test. In some embodiments, statuses are determined by comparing aircraft parameters during the test to the limits and/or targets associated with each test. At the end of a flight, operators can evaluate the test results and/or determine whether any aspects of the flight (e.g., points or activities) should be re-flown or re-tested.

In some embodiments, each test card can also include a fuel value, such as an amount of fuel the test card is expected to consume and/or an expected fuel value that should remain upon completion of the test card. The flight test card service can compare the actual fuel remaining to the expected fuel remaining to calculate a delta fuel value (difference) between the actual fuel and the expected fuel. If the delta fuel value indicates there is insufficient fuel to perform a card and/or complete the rest of the test deck, the flight test card service can modify the test deck to perform one or more other cards (e.g., cards for which there is sufficient fuel) and/or to end the test (e.g., if there is insufficient fuel for other cards).

Advantageously, using flight test decks and automatically determining which test cards can be performed, and which should be skipped and/or removed from a test deck enables operators of the aircraft to adapt to various situations that can arise during a test flight by quickly changing the test plans. Changing the test plan can improve efficiency (e.g., by carrying out tests according to how much fuel is available) and safety (e.g., by allowing test crew in a control room to focus on monitoring telemetry from the aircraft, and/or by allowing the operator to focus more on operating the aircraft, than on strategically managing a test plan).

Various embodiments of the service and associated systems and methods will now be described. The following description provides specific details for a thorough understanding, and an enabling description, of these embodiments. One skilled in the art will understand, however, that the service and associated systems and methods may be practiced without many of these details or with alternative approaches. Additionally, some well-known structures or functions may not be shown or described in detail so as to avoid unnecessarily obscuring the relevant description of the various embodiments. The terminology used in the description presented below is intended to be interpreted in its broadest reasonable manner, even though it is being used in conjunction with descriptions of certain specific embodiments of the system and methods.

Suitable Environments

Figure 1B:
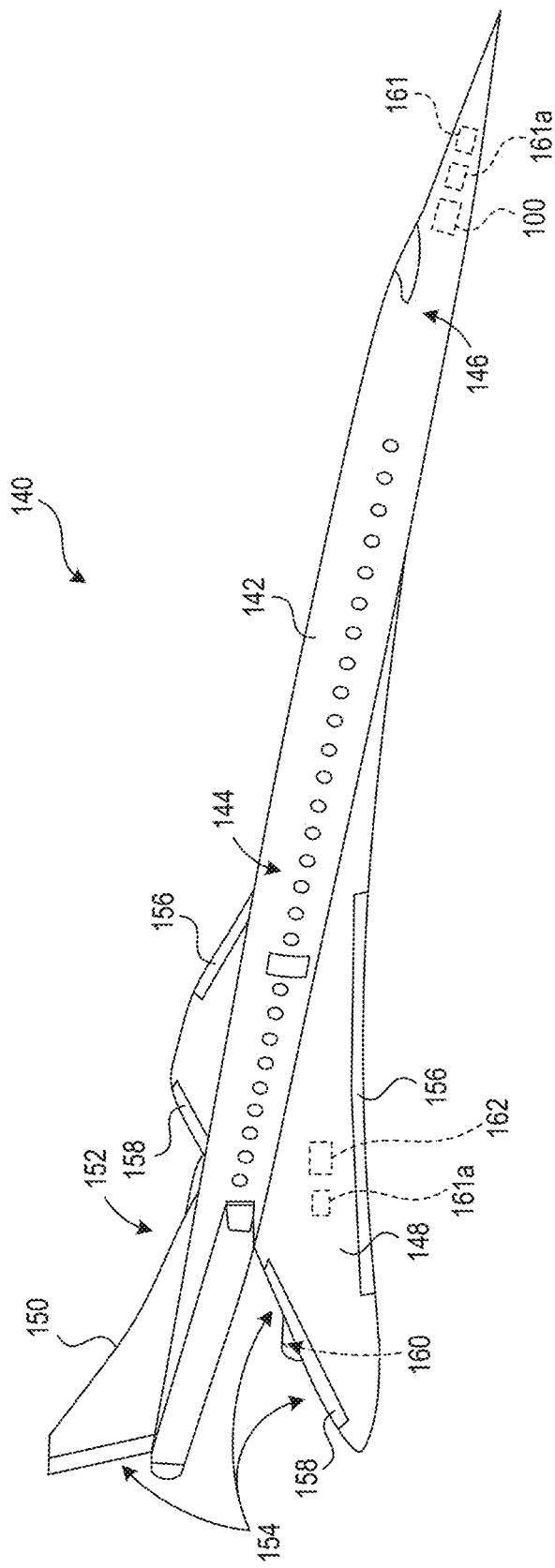
FIG. 1B illustrates a partially schematic, isometric illustration of a representative aircraft in which, and/or with which, flight test card services configured in accordance with embodiments of the present technology can operate.
Figure 1C:
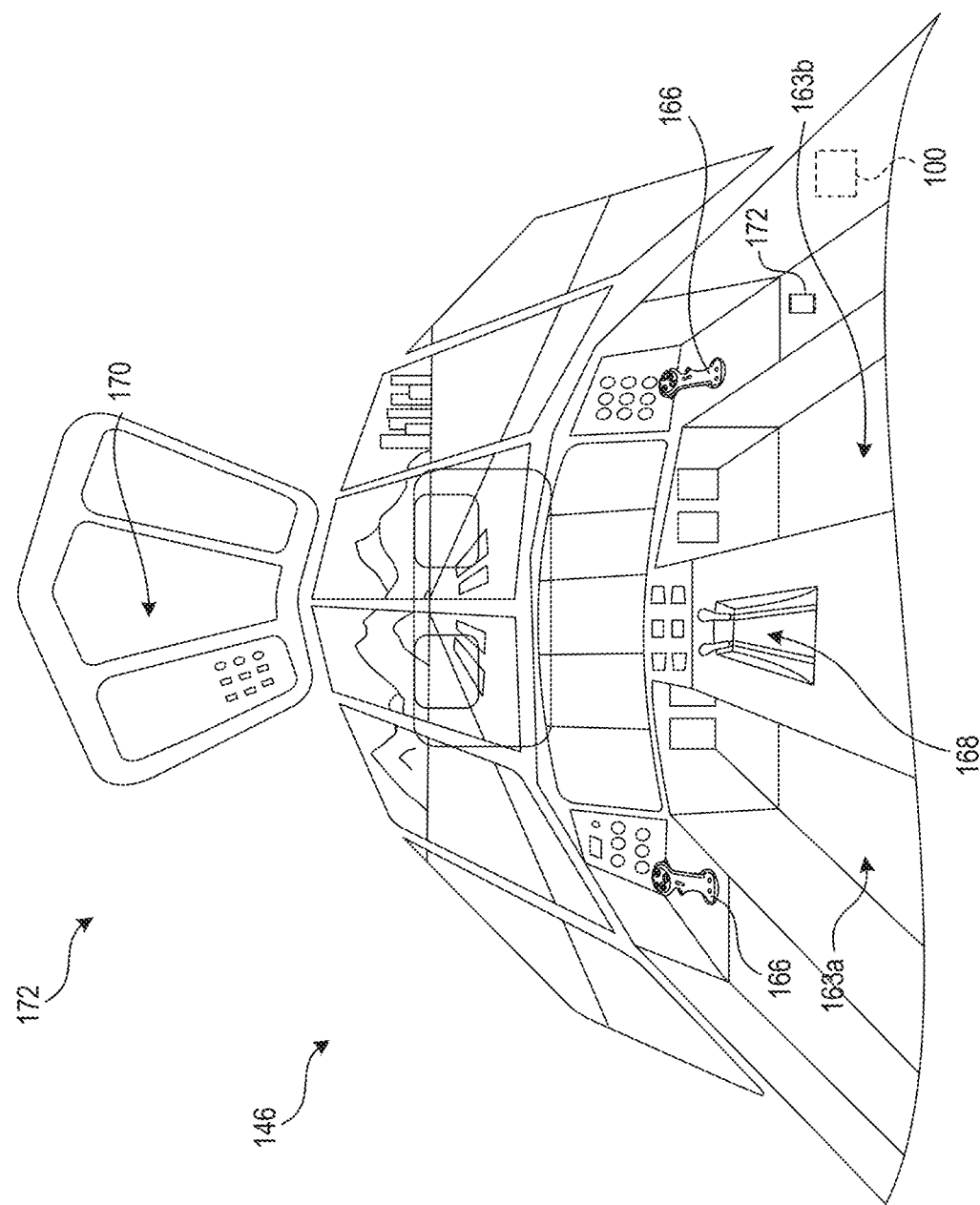
FIG. 1C is a partially schematic, isometric illustration of a representative flight deck in which, and/or with which, flight test card services configured in accordance with embodiments of the present technology can operate.

FIGS. 1A, 1B, and 1C and the following discussion provide a brief, general description of a suitable environment in which representative flight test card services can be implemented. Although not required, aspects of embodiments of the service are described in the general context of computer-executable instructions, such as routines executed by a general-purpose computer, a personal computer, a server, or other computing system. The service can also be embodied in a special-purpose computer or data processor that is specifically programmed, configured, or constructed to perform one or more of the computer-executable instructions explained in detail herein, e.g., a flight deck-based and/or ground-based controller. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random-access memory (RAM), read-only memory (ROM), flash memory, or the like, or a combination of such components. Computer-executable instructions may also be stored in one or more storage devices, such as magnetic or optical-based discs, flash memory devices, or any other type of non-volatile storage medium or non-transitory medium for data. Computer-executable instructions may include one or more program modules, which include routines, programs, objects, components, data structures, and so on that perform particular tasks or implement particular abstract data types. Information handled by these computing systems can be presented at any suitable display medium, including a CRT display or LCD.

Aspects of the service can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the systems described herein can be stored or distributed on tangible, non-transitory computer-readable media, including magnetic and optically readable and removable computer discs, or stored in firmware in chips (e.g., EEPROM chips). Aspects of the service may be provided electronically over the Internet or over other networks (including wireless networks). That is, aspects of the flight test card services can be executed by computing systems within an aircraft, by computing systems located on the ground (e.g., at a ground-based controller), or in combinations of the two (e.g., aircraft-based and ground-based computing systems, in communication with each other, implementing aspects of the flight test card services). Those skilled in the relevant art will recognize that portions of the service may reside on a server computer, while corresponding portions may reside on a client computer. Data structures and transmission of data particular to aspects of the systems are also encompassed within the scope of the systems. Databases described herein may take a variety of forms, and the term "database" is used herein in the generic sense to refer to any data structure that allows data to be stored and accessed, such as tables, lists, arrays, etc.

FIG. 1A illustrates an example computing system 100 on which a flight test card service (e.g., a computer-based method) can operate. The computing system 100 can include one or more processors 105, one or more memories 110, one or more input-output interfaces 115, and/or one or more human-machine interfaces ("HMI(s)") 120. As described above, the one or more processors 105 can include programmable general-purpose or special-purpose microprocessors, programmable controllers, ASICs, PLDs, or the like, and/or a combination of such devices. The one or more memories 110 can include RAM, ROM, flash memory, or the like, and/or a combination of such components.

The one or more input-output interfaces 115 allow the computing system 100 to communicate with external computing devices and/or other aspects of a flight test card service (such as a telemetry system and/or sensors, described below). For example, the one or more input-output interfaces 115 can allow the computing system 100 to communicate with external computing devices 130-132 via a network 135. The one or more input-output interfaces 115 can communicate with the network 135 using a wired connection, such as an Ethernet cable or other communication cable, or a wireless connection, such as a LAN, a WAN, a wireless pairing communication connection, the Internet, and the like.

The one or more HMIs 120 allow a user of the computing system 100 to interact with the computing system 100. The one or more HMIs 120 can include a keyboard, a mouse, a touch screen, a control, a display, a microphone, and the like. The one or more HMIs 120 allow the user to input data and commands into the computing system 100 and receive output from the computing system 100, such as results of data processing, outcome messages from processes, and data from processes such as the processes described herein. In some embodiments, some or all of the elements of the computing system 100 can be positioned in, and/or connected to, a ground-based location such as a test center, where operators can communicate information for the flight test card service. For example, in some embodiments, operators can operate the computing system 100 in a ground-based location and communicate test information to a pilot, who can carry out aspects of the flight test, while the aircraft can communicate telemetry data to the ground-based location and/or the pilot can communicate notes or commentary about the test.

FIG. 1B illustrates a partially schematic, isometric illustration of a representative aerospace system including an aircraft 140 (e.g., a supersonic aircraft) in which, and/or with which, flight test card services configured in accordance with embodiments of the present technology can operate. The aircraft 140 includes a fuselage 142, which houses a passenger cabin 144 and flight deck 146. The passenger cabin 144 can be configured to carry any suitable number of passengers. In some embodiments, the passenger cabin 144 can be omitted and/or the aircraft 140 can be unmanned. The aircraft 140 can include one or more wings 148, a vertical stabilizer 150 (e.g., carried by an empennage 152 of the aircraft 140), and/or suitable flight control surfaces 154 carried by the one or more wings 148 and/or the vertical stabilizer 150 (e.g., a rudder), for aircraft stability and control. The flight control surfaces 154 can include slats 156 on the leading edge(s) of the wing(s) 148, flaps 158 on the trailing edge(s) of the wing(s) 148, and/or other flight control surfaces 154 (e.g., elevators, stabilizers, and/or elevons) suitable for aerodynamically controlling an aircraft during takeoff, climb, flight, approach, landing, and/or other activities. The aircraft 140 can further include one or more propulsion systems 160 configured to power the aircraft efficiently at supersonic and/or subsonic speeds.

The aircraft 140 can further include a telemetry system 161 (illustrated schematically) which can include telemetry components 161a such as systems, sensors, and/or instruments for detecting and outputting information related to any suitable aspect of the aircraft 140, such as a configuration of a flight control surface 154, an airspeed, an altitude, etc. Such components 161a (e.g., systems, sensors, and/or instruments) are illustrated schematically in FIG. 1B. Persons of ordinary skill in the art will understand flaps, slats, rudders, various other flight control surfaces, propulsion systems, and their effects on aerodynamics and flight, as well as telemetry systems and sensors associated with measuring and reporting aspects of the aircraft and the flight. The aircraft 140 can further include one or more fuel tanks 162 (illustrated schematically) for storing and distributing fuel for the aircraft 140. In some embodiments, one or more of the telemetry components 161a can include one or more fuel amount sensors to determine an amount (e.g., by volume and/or by weight) of fuel in the one or more fuel tanks 162 and/or one or more sensors suitable for determining the weight and/or balance of the aircraft 140 (which can further be used to determine a fuel weight). In general, one or more of the telemetry components 161a can include any suitable fuel amount sensors for determining, at any given moment and/or periodically, the amount of fuel in the one or more fuel tanks 162. Suitable sensors for determining quantities of fuel are known in the art of aviation and engineering.

The aircraft 140 can include one or more components of the computing system 100 (see FIG. 1A), which can operate a flight test card service and/or operate automatically, autonomously, remotely, and/or under the direct control of pilots seated at the flight deck 146 to control the aircraft 140. The flight deck 146 may be outfitted with one or more displays associated with the computing system 100, as explained below with regard to FIG. 1C.

FIG. 1C is a partially schematic, isometric illustration of a representative flight deck 146 in which, and/or with which, flight test card services configured in accordance with embodiments of the present technology can operate. The flight deck 146 includes crew seats 163, including a pilot seat 163a and a first officer seat 163b. The pilot and first officer can each have access to a corresponding side stick 166 to control the aircraft flight direction. The flight deck 146 can further include a digital throttle, nozzle and/or inlet control 168 to control the propulsion system(s) 160. An overhead panel 170 can include control input and output elements. The flight deck 146 can include one or more displays 172, for example, one or more flat panel touch displays, one or more heads-up displays, one or more pop-up displays, and/or one or more portable displays (e.g., a tablet device or other portable device), one or more of which displays can be operatively connected to, and/or part of, the computing system 100.

In some embodiments, flight test card services can include ground-based systems in which operators in a control room view test information and communicate the test information to a pilot or other operator in the aircraft 140, who carries out some aspects of the test, and in which the ground-based system receives telemetry data and/or commentary from the aircraft 140 and/or the pilot. However, in some embodiments, the displays 172 can present and/or receive information from the flight test card service and/or other information associated with the aircraft 140 (e.g., the displays 172 can constitute one or more of the HMIs 120). In some embodiments of the flight test card service, the computing system 100 can present test cards, test points, and/or other information related to the flight test card service on one or more of the displays 172. Accordingly, in some embodiments, the pilots of the aircraft 140 (and/or another operator onboard the aircraft 140) can operate the flight test card service by viewing test information on the displays 172 and/or inputting information into the system 100. Generally, embodiments of the system 100 and/or the service 200 can be implemented onboard an aircraft 140 and/or at a ground-based location.

Representative Services and Systems

Figure 2:
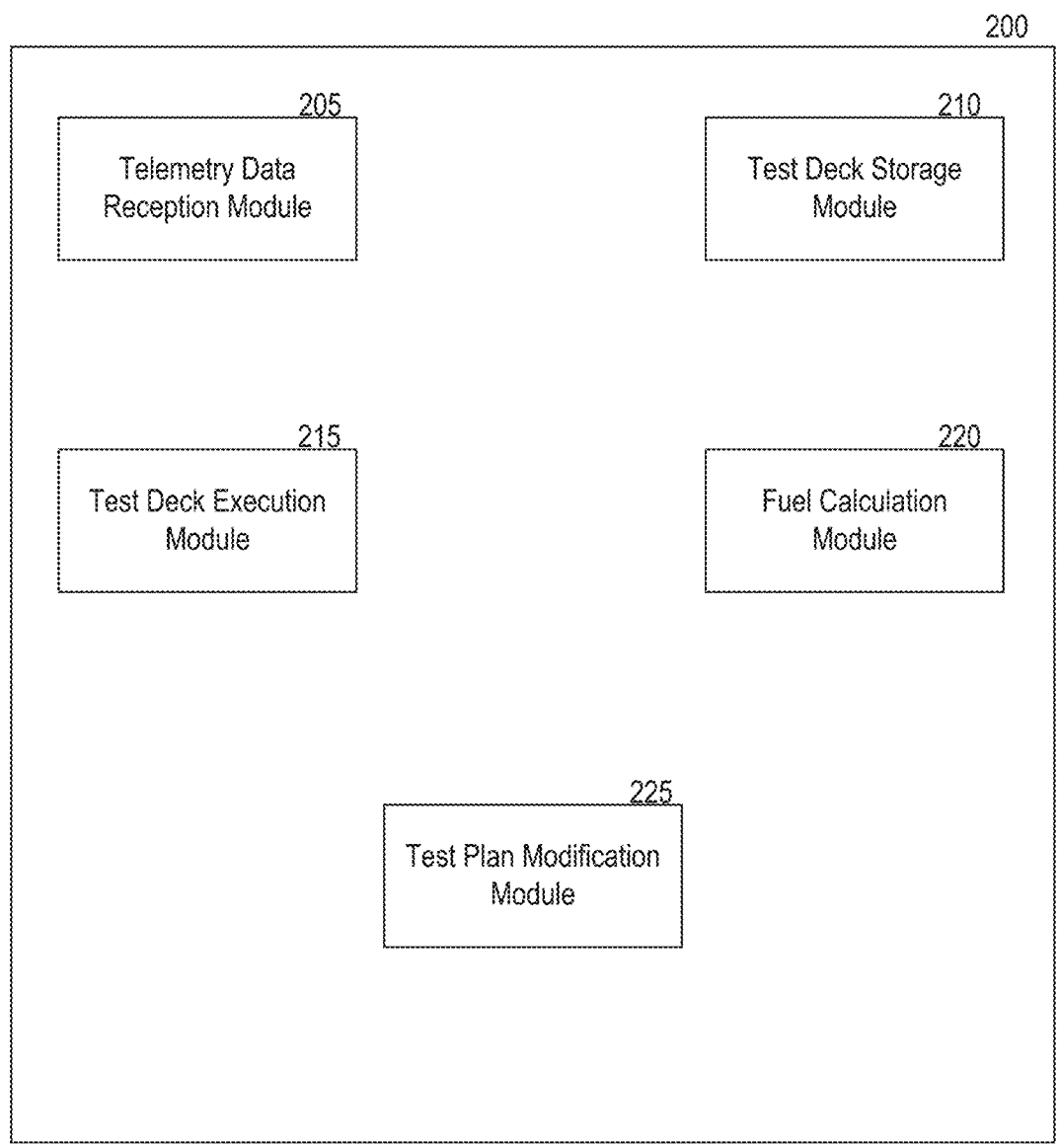
FIG. 2 is a block diagram illustrating modules that perform a flight test card service in accordance with some embodiments of the present technology.

FIG. 2 is a block diagram illustrating modules of software that perform a flight test card service 200, in accordance with some embodiments of the present technology. Aspects of the service 200 may be practiced on one or more computing devices or systems of an aircraft, one or more user devices associated with users in and/or of the aircraft, one or more ground-based computing systems (e.g., for ground-based operators to view test cards and/or test decks to communicate test points to an operator of the aircraft), and/or combinations thereof. For example, aspects of the service 200 can be practiced in the computing system 100 described above with regard to FIG. 1A, and/or an aerospace system including an aircraft 140 described above with regard to FIGS. 1B and 1C. The modules can include a telemetry data reception module 205, a test deck storage module 210, a test deck execution module 215, a fuel calculation module 220, and/or a test plan modification module 225.

The telemetry data reception module 205 (which can be positioned onboard an aircraft or in a ground-based control room) can subscribe to a telemetry system aboard the aircraft (e.g., the telemetry system 161 described above) and receive data from some or all of the telemetry components (e.g., the telemetry components 161a described above, such as sensors) of the telemetry system. In some embodiments, the telemetry system 161 can track data from one or more of the instruments and/or sensors aboard the aircraft and can propagate that data to various systems, such as ground-based aircraft tracking systems, safety monitoring systems aboard the aircraft, and the like. The telemetry data can include a speed of the aircraft, an altitude of the aircraft, an attitude of the aircraft, an angle of attack of the aircraft, data from various sensors aboard the aircraft, and/or the like.

In some embodiments, the telemetry data reception module 205 can derive, calculate, and/or otherwise determine values from data received from the various instruments and/or sensors aboard the aircraft. Representative values include a weight of the aircraft, a current fuel amount onboard the aircraft, weight distribution of the fuel onboard the aircraft, and/or other values. In some embodiments, the telemetry data reception module 205 can obtain these values directly from sensors carried by the aircraft (e.g., telemetry components 161a of the telemetry system 161). The telemetry data reception module 205 can also provide telemetry data to other modules for use in various calculations and determinations as described in further detail below. In some embodiments, the telemetry data reception module 205 can also communicate various test limits and/or targets back to the telemetry system 161, which can affect when warnings and alerts are generated by the telemetry system 161. In some embodiments, the telemetry data reception module 205 can also receive landing and takeoff times for recording in a memory (e.g., the memory 110). Typically, takeoff is detected when weight is no longer on the landing gear, and landing is detected when weight is applied to the landing gear. This data can be useful in later sensor analysis.

The test deck storage module 210 can include a database storing one or more test decks. The test decks can include one or more test cards that are executed as a set during a test flight of an aircraft, and/or which instruct an operator to carry out actions. Test decks can test various features of the aircraft. In some embodiments, a test deck can test features of the aircraft that can be grouped by flight system, aircraft component, flight phase, and the like. For example, certain test decks can test an anti-icing system of the aircraft, components on the wings of the aircraft (such as flaps), components and systems of the aircraft associated with takeoff or landing, and the like.

Each test card in a test deck can include various configurations for the test, initial conditions for the test, limits and/or targets for each test, and an ordered list of test points and/or a procedural checklist. Test configurations can include various settings for components, such as landing gear up or down, flap settings, and the like. Initial conditions for the test define operating parameters of the aircraft for the particular test card. Initial conditions can include air speed, angle of attack, attitude, flying altitude, bank angle, and the like. The initial conditions must be met before the test card can be executed. Each test card can also include an expected fuel value that should remain upon completion of the test card and/or a fuel value that the test card is expected to use. An example test card is described in further detail below.

The test deck execution module 215 executes test decks during test flights. The test deck execution module 215 can include instructions that, when executed, select test decks from the test desk storage module 210 to execute during the test flight. In some embodiments, an operator can instruct the flight test card service 200 regarding which test deck to use (e.g., via the HMI(s) 120), and the test deck execution module 215 executes that test selected deck. The test deck execution module 215 can also set various limits and/or targets for each test card in the executed test decks, and communicate the limits and/or targets, via the telemetry data reception module 205, to the telemetry system 161 of the aircraft.

The test deck execution module 215 can execute each point on each test card of the test deck. To execute a test card, the test deck execution module 215 can output to a user of a computing device or system (e.g., the computing system 100) various settings for components of the aircraft and/or the initial conditions necessary to begin the test. In some embodiments, the operator of the aircraft can control aspects of the aircraft to meet the settings and/or conditions. The test deck execution module 215 can receive telemetry data (e.g., from the telemetry system 161) that indicates the component settings and/or the initial conditions. The test deck execution module 215 can compare the telemetry data with the requirements of the test card to determine if the settings and initial conditions meet the requirements of the test card. In some embodiments, the computing system 100 can output a status of whether the settings and conditions have been met, such as via a display using colors and/or symbology. In response to meeting the requirements of the test card, the test deck execution module 215 can present the list of test points to the user (e.g., in a sequentially ordered list). In some embodiments, the computing system 100 can display test points on displays for a pilot, a co-pilot, a first officer, a flight engineer, and/or other test engineers on the aircraft and/or on the ground, and/or other people or systems.

In some embodiments, the computing system 100 displays each test point simultaneously in a list and/or another simultaneous display format. In some embodiments, the computing system 100 can display each test point in sequence (i.e. one after another as points are completed). Each test point represents an action or check that the operator is to perform. The telemetry system 161 can receive data indicating the performance and/or status of the aircraft while the actions are performed. In response to, and based upon, the data and/or the limits associated with each test point, the computing system 100 can give each test point a test point status, such as a numerical scale for the quality of the data and/or another status. In some embodiments, the computing system 100 can link data from the telemetry system 161 with each test point and assign the status to each test point. For example, from the time a test point is initiated (starting time) to a time when the test point is completed (end time), the computing system 100 can record data from the telemetry components 161a (e.g., sensors) and link the data with the test point for later analysis by a user, the computing system 100, and/or another system. In some embodiments, the computing system 100 can receive data for one or more test points from human input.

In some embodiments, the computing system 100 (e.g., the test deck execution module 215) can use any suitable criteria for determining data quality, such as a 1 to 5 scale. Example criteria can include a rating of telemetry data values as compared to pre-defined acceptable target values for each test point, which values can be stored in the computing system 100. As a more specific, non-limiting example, the 1-5 scale can be defined as follows: 5 points when the telemetry data values are 100% within the middle half of a pre-defined limit range around the target value; 4 points when the telemetry data values are 100% within the limit range; 3 points when the telemetry data values are between 90% and 100% within the limit range; 2 points when the data values are between 80% and 90% within the limit range; and 1 point when the data values are less than or equal to 80% within the limit range. In some embodiments, the status representative of data quality can depend on the system (e.g., which telemetry components 161a) providing the data.

The fuel calculation module 220 can receive data from sensors (e.g., one or more of the telemetry components 161a, described above) indicating a current fuel level and/or amount. In some embodiments, the fuel calculation module 220 can receive any suitable fuel amount information from a suitable fuel sensor in the telemetry components 161a, and the fuel calculation module 220 can determine a percentage of fuel remaining, a percentage of fuel used, or other suitable amounts of fuel relevant to determining how much fuel is available in the aircraft. In some embodiments, instead of receiving direct values indicating fuel load, the fuel calculation module 220 can receive aircraft weight and balance values from the sensors (e.g., one or more of the telemetry components 161a, described above) and calculate an amount of fuel remaining in the aircraft based on these values and known values of the aircraft, such as aircraft weight and cargo weight. The fuel calculation module 220 can also record fuel values at different times during the test flight of the aircraft and perform comparisons of the recorded fuel values to determine how much fuel individual test cards use. In some embodiments, the fuel calculation module 220 can calculate a delta fuel value between an actual fuel load used for a test point and/or test card and an expected fuel load value for the test point and/or test card. The delta fuel value can assist with calibrating the test cards and/or for other analysis. In some embodiments, a user can program the expected fuel used into the test card (e.g., via the HMI(s) 120) based on calculations understood to those of ordinary skill in the art of aircraft engineering and sciences. In some embodiments, the system can analyze the sequence of altitude and airspeed values in a test card to create a flight pattern with which the system can estimate fuel burn. Based on the current fuel level and the expected fuel usage for a test card, the fuel calculation module 220 can periodically, on demand, and/or periodically update the expected fuel amount that will remain after a test card is completed.

In some embodiments, instead of, or in addition to, the test card having an expected fuel amount remaining after being completed, the test card can include an indicator of total fuel consumption if the test card is performed. The total fuel consumption for a given test card can include the sum of the fuel needed to reposition the aircraft from the end of the previous test card to the initial conditions for the current/next test card, and the estimated fuel needed to complete the tests contained in that test card.

In some embodiments, the fuel calculation module 220 can receive and/or calculate an expected fuel usage value for one or more test cards and, based on the current fuel level of the aircraft, the fuel calculation module 220 can determine if the remaining test cards can be completed. If the remaining test cards cannot be completed, the fuel calculation module 220 can pass this information on to the test plan modification module 225 (e.g., the fuel calculation module 220 can instruct the test plan modification module 225 to modify the test deck).

The test plan modification module 225 can modify a currently executing test deck and/or a planned future test deck for the test flight based on sensor data from the telemetry system 161 (via the telemetry data reception module 205), fuel information from the fuel calculation module 220, and/or other data sources. The test plan modification module 225 can remove (e.g., "drop") test cards from a test deck, and not perform the test cards during a given test execution, to ensure that the aircraft/operator will have sufficient fuel to safely land (i.e., greater than, or equal to, an amount required to safely land).

In some embodiments, in addition to, and/or as an alternative to expected fuel consumption values, the test cards can have priority values. The test plan modification module 225 can select which test cards to remove from the test deck based on the expected fuel consumption values and/or the priority values. In some embodiments, the test plan modification module 225 can include instructions that, when executed, provide a user with a list of test cards for the user to select from (e.g., via the HMI(s) 120). The list can be pre-prioritized and the module 225 can include facilitating a user's re-prioritization of the list (e.g., re-ordering and/or re-assigning priority values). A representative sequence for modifying the test deck is described in further detail below.

Flow Diagrams, Methods, and Processes for a Flight Test Card Service

Figure 3:
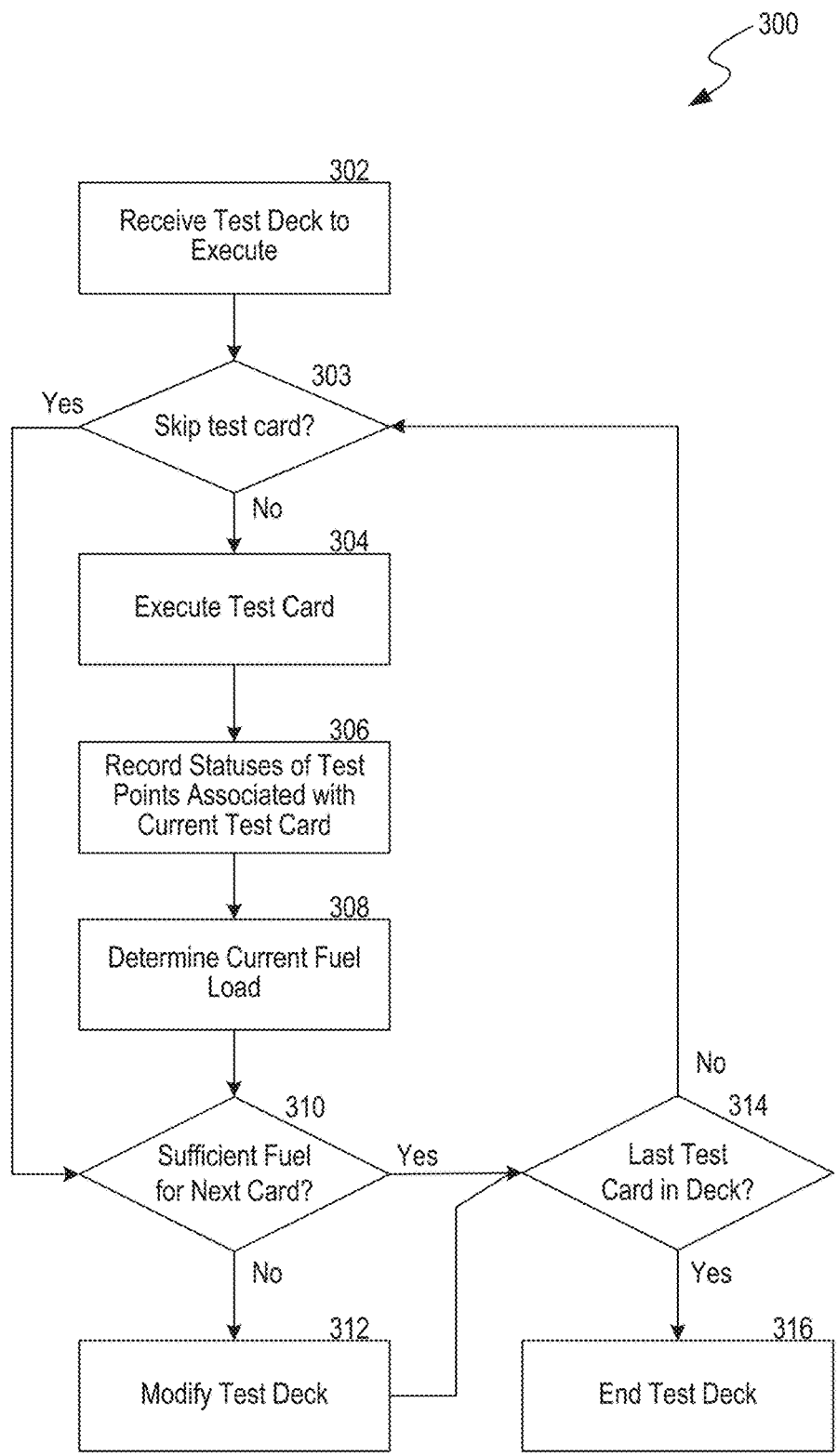
FIG. 3 is a flow diagram illustrating a process for executing a test deck in accordance with some embodiments of the present technology.
Figure 4:
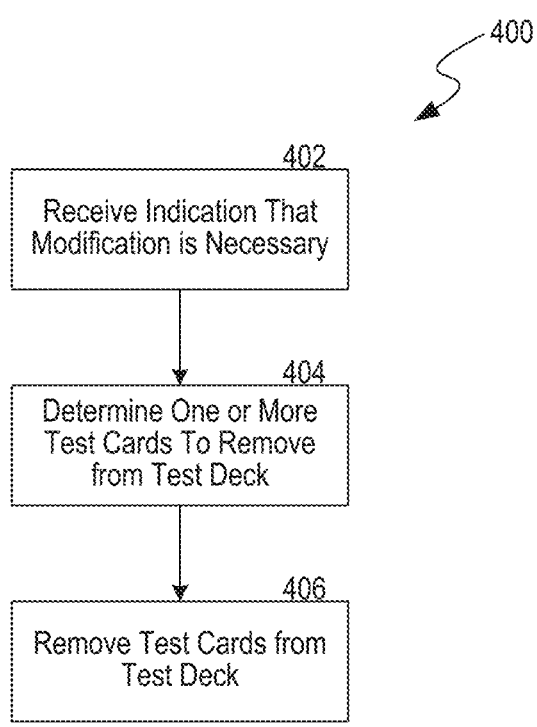
FIG. 4 is a flow diagram illustrating a process for modifying a test deck in accordance with some embodiments of the present technology.

FIGS. 3 and 4 are flow diagrams illustrating example methods or processes 300, 400 respectively, implemented by a flight test card service for performing a test flight.

FIG. 3 is a flow diagram illustrating a representative execution process 300 for executing a test deck, in accordance with some embodiments of the present technology. In some embodiments, the test deck execution module 215 and/or other components of the service 200 and/or the computing system 100 can carry out the execution process 300 (e.g., by executing instructions for steps of the execution process 300). The execution process 300 can, in some embodiments, be initiated in response to a user input at a computing device indicating that the test deck is to be executed (e.g., one or more of the HMI(s) 120). In other embodiments, the execution process 300 can be initiated in response to one or more conditions being met, such as the aircraft 140 taking off, reaching a certain altitude, or performing another action detectable by one or more sensors, which can be associated with the telemetry system 161.

At block 302, the execution process 300 can include the execution module 215 receiving a test deck to execute. The test deck includes one or more test cards. Each test card includes one or more test points. The test points each include certain actions to be performed and/or measurements to be checked. Each of the test cards in the test deck can be executed in a sequential order during the test flight and/or in another order.

At this initial stage of the execution process 300 in block 302, the full test deck can be available for execution. However, as described in further detail below, the actual execution of the test deck may include all or fewer than all of the test cards. For example, one or more test cards can be skipped and/or one or more test cards can be removed from the test deck during execution of the execution process 300. Accordingly, although a typical execution process 300 can include executing every test card, in some embodiments, multiple runs of the execution process 300 can include different executions of the test deck, with each run of the execution process 300 (e.g., each test flight) skipping and/or removing one or more test cards.

Next, in some embodiments, at decision block 303, the execution process 300 can include determining whether to skip the test card for one or more reasons. For example, if a system associated with a test card is malfunctioning, the aircraft is behaving unexpectedly, and/or a sensor is exhibiting a suspicious reading, the execution process 300 can skip the test card (e.g., automatically and/or by pilot input via the HMI(s) 120 requesting that the card be skipped). If the execution process 300 skips the test card, the execution process 300 can skip to block 310 (described below). If the execution process 300 does not skip the test card, the execution process 300 can proceed to block 304. The execution process 300 can include recording a status of the test card associated with whether it was skipped or not skipped. In post-test review, a skipped status of a test card can indicate to analysts and/or the system reviewing the data to not look for and/or analyze data associated with that test card.

At block 304, execution process 300 executes a first test card from the test deck. As described below in relation to FIG. 6, the test card can include a set of test points (e.g., an ordered/sequential set of test points) to be executed. Execution of the test card can include displaying the test points and/or otherwise directing an operator to perform the test points, and recording data as the operator carries out the test points. In some embodiments, the process can include configuring the aircraft according to test points related to settings or initial configurations of the aircraft (e.g., control surface settings, initial altitude settings, etc.) prior to performing test points that include actions for the aircraft (e.g., climb, land, roll, etc.).

At block 306, the execution process 300 can include recording the statuses of each test point for the current test card. Each test point can include an associated status that is set upon execution of the test point during the test flight and/or after the test flight. The service 200 can gather data from the telemetry system 161 of the aircraft 140 and compare the data to limits and/or pre-set parameters associated with each test point. The status can include the result of the comparison, such as a quality of the data (as described above), a status regarding validity of the data, a status regarding whether the test point and/or the test card was passed, and/or other suitable indicators of a test point status. In some embodiments, the execution process 300 can include recording a starting time and an ending time of each test point and associating data received from the telemetry system of the aircraft with the test point for later and/or concurrent analysis (e.g., for determining the status). Accordingly, in some embodiments, the computing system 100 (for example, specifically, the test deck execution module 215) can receive a starting time for the test point, an ending time for the test point, and based on those times, associate the telemetry data with the test point.

At block 308, the execution process 300 can include determining a current fuel load of the aircraft 140. In some embodiments, the execution process 300 can include the fuel calculation module 220 receiving sensor data from the telemetry components 161a (e.g., via the telemetry data reception module 205) and determining the current amount of fuel in the aircraft 140. In some embodiments, the telemetry system 161 of the aircraft 140 can include sensors (i.e. the telemetry components 161a) that can directly detect the current amount of fuel in the aircraft 140. In other embodiments, the current amount of fuel can be derived from one or more weight parameters of the aircraft 140 that can be measured by the telemetry system 161. For example, a starting weight of the aircraft 140 before the test flight can be recorded, including a known weight of the aircraft 140 and any cargo and flight crew. Sensors (i.e. the telemetry components 161a) can detect the weight of the aircraft 140 (and/or an amount of fuel remaining in fuel tanks of the aircraft 140) and the execution process 300 can include comparing the current weight to the known starting weight of the aircraft 140. Using the starting weight, the current weight, and the known weight of cargo and flight crew, the fuel calculation module 220 and/or another aspect of the service 200 can calculate a change in amount of fuel to calculate a current fuel value for the aircraft 140.

At decision block 310, the execution process 300 can include determining if the aircraft 140 has sufficient fuel for executing the remaining test cards in the test deck. In some embodiments, the fuel calculation module 220 and/or another aspect of the service 200 can execute instructions that compare estimated fuel consumption values associated with each test card with the amount of fuel available (e.g., the current fuel value). For example, if a test card requires an estimated 10,000 pounds of fuel, the execution process 300 can use the current amount of fuel to determine if the card can be safely completed with that amount of fuel.

In some embodiments, determining if the aircraft 140 has sufficient fuel for safely executing one or more of the remaining cards in the test deck (i.e., an amount that is equal to, or greater than the amount needed to execute the one or more of the remaining cards) can include estimating the amount of fuel needed to end the test flight and safely land the aircraft. For example, in some embodiments, the fuel calculation module 220 (and/or another aspect of the service 200) can include instructions to calculate the fuel needed to end the test flight based on the aircraft's 140 altitude, latitude, longitude, heading, and/or airspeed. For example, the fuel calculation module 220 can determine (a) how much fuel will be used to turn the aircraft until it is pointed at a landing destination (e.g., an airport) based on the heading and airspeed before the turn, and the estimated altitude, latitude, and longitude at the end of the turn; (b) the fuel required to fly to the landing destination at a suitable altitude to begin a landing procedure; (c) fuel required for a typical traffic pattern at the landing destination; (d) fuel required for a minimum number of landing attempts at the landing destination (e.g., according to government regulations and/or other policies); and/or (e) fuel required after a successful landing (e.g., for taxiing). Generally, the greater the aircraft's distance away from the landing destination and the faster the aircraft is traveling away from the landing destination, the greater the fuel required to return to the airport and safely land. The fuel calculation module 220 and/or another aspect of the service 200 and/or the computing system 100 can periodically or continually update the fuel required to reach a landing destination and include this quantity in the determination of whether to execute one or more remaining cards in the test deck.

If the amount of fuel remaining in the aircraft 140 is insufficient to complete one or more test cards in the test deck ("No" at decision block 310), the execution process 300 can include modifying the test deck (at block 312, e.g., using the test plan modification module 225). For example, in some embodiments, test cards can be removed from the test deck until there is sufficient fuel to fly the remaining test cards. The execution process 300 can include modifying the test deck at least until the airplane's current fuel value is sufficient for executing one or more (e.g., a subset) of the remaining test cards in the test deck and landing safely. Modifying the test deck is described in additional detail below with regard to FIG. 4. After modifying the test deck (block 312), in some embodiments, the process can return to block 310 or it can proceed to block 314. For example, if the amount of fuel remaining in the aircraft is sufficient to complete the remaining test cards ("Yes" at decision block 310), the execution process 300 moves on to decision block 314. In some embodiments, the execution process 300 can include generating audit logs that include relevant input parameters and the result of any test deck modifications. The computing system 100 can store the audit logs.

At decision block 314, the execution process 300 includes determining if there are test cards remaining in the test deck. If there are cards remaining in the test deck ("No" at decision block 314), the execution process 300 can return to block 303 (e.g., to skip and/or execute the next test card in the test deck). If no cards remain in the test deck ("Yes" at decision block 314), the test deck is ended (at block 316). In some embodiments, the computing system 100 can inform an operator that the test deck is complete (e.g., via the HMI(s) 120 and/or another display or indicator). In some embodiments, the service 200 can offer the operator a new test deck to start, or the operator can end the test flight and land.

FIG. 4 is a flow diagram illustrating a test deck modification process 400 (referred to herein simply as a modification process 400) for modifying a test deck, in accordance with some embodiments of the present technology. In some embodiments, the computing system 100 can execute the process 400 in response to receiving a request to modify the test deck. Such a request can come from an operator via an HMI 120, from another aspect of the computing system 100 (e.g., the test deck execution module 215) as part of the execution process 300, and/or for other reasons. In some embodiments, the test plan modification module 225 can include instructions that, when executed, perform the modification process 400.

At block 402, the modification process 400 includes receiving, at the computing system 100, an indication that the test deck currently being performed must be modified. The indication can be received, for example, from the execution process 300 or from a similar process executing a test deck for a test flight. In other embodiments, an operator of the computing system 100 can manually request a modification to the test deck. In some embodiments, the indication is received in response to a current amount of fuel in the aircraft being insufficient for executing the test deck, as described above with regard to the fuel calculation module 220, for example.

At block 404, the modification process 400 includes determining one or more test cards to remove from the test deck. This can be accomplished by comparing the current amount of fuel remaining onboard the aircraft with an expected amount of fuel required for one or more of the test cards and/or for a safe landing. For example, one test card can indicate that 10,000 pounds of fuel will be required to complete the test card. If the aircraft requires 5,000 pounds of fuel to return from a current location of the aircraft to a landing site and that the aircraft only has 12,000 pounds of fuel remaining, the test card requiring 10,000 pounds of fuel can be removed from the test deck. In contrast, if a test card only requires 2,000 pounds of fuel, the test card can remain in the test deck because the aircraft has sufficient fuel to complete the test card and still return safely from the test flight. In some embodiments, the fuel calculation module 220 can perform the comparison and/or provide fuel data and/or an instruction to perform the comparison.

In some embodiments, there may be multiple potential test card candidates that can be removed from a test deck (e.g., in the event that the total fuel consumption for the entire deck exceeds the amount of fuel available to the aircraft). In such embodiments, candidates for removal can be prioritized based on overall objectives of the test program and/or based on the amount of fuel each test card may use. For example, an operator and/or the computing system 100 can prioritize dropping the test cards that require the most fuel to reposition the aircraft to initial conditions for a test, test cards that have long time durations, and/or test cards of lesser importance to the overall objective. The operators can pre-set the priority values of each test card and the system 100 can arrange test cards in order in the test deck.

Although in some embodiments, fuel quantity is a determinant for whether to skip or remove a test card, in further embodiments, other factors can influence whether to skip or remove a test card. For example, other factors can include warnings and/or alerts related to malfunctioning systems, the operator (e.g., a pilot) experiencing unexpected vehicle behavior and/or performance, and/or suspicious sensor readings.

At block 406, the process 400 includes removing one or more of the test cards from the test deck. In some embodiments, the computer system 100 notifies the operator that the test card has been removed (e.g., via an HMI 120). If the removed test card was to be the next test card executed, the computing system 100 loads the next test card in the test deck for execution (e.g., for presentation to the operator). In some embodiments, when the test plan modification module 225 removes a test card, the fuel calculation module 220 can recalculate the estimated fuel needed to reposition the aircraft to the initial conditions of the next test card and update the total fuel required to complete the test flight.

Example Test Decks, Test Cards, and Test Points

Figure 5:
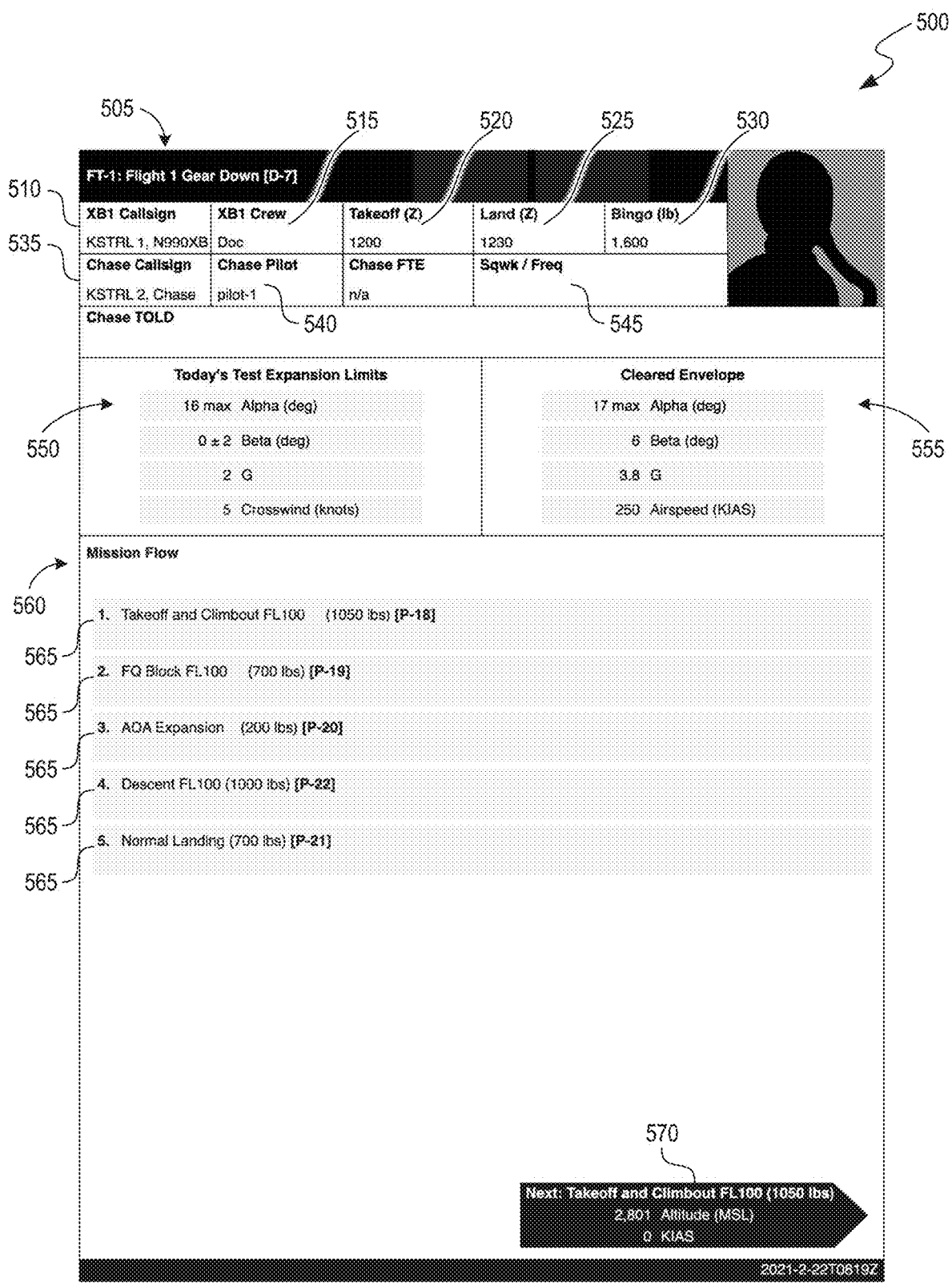
FIG. 5 is a representative diagram illustrating a test deck configured in accordance with some embodiments of the present technology.

FIG. 5 illustrates a view of a graphical user interface associated with a representative test deck 500 configured in accordance with some embodiments of the present technology. In some embodiments, the view in FIG. 5 can be considered a cover sheet or listing of cards in the test deck 500. The test deck 500 can include a title 505, an indication 510 of the aircraft to be tested, a crew designation 515, a takeoff time 520, a landing time 525, a fuel limit 530 (e.g., a minimum or bingo fuel quantity required to reach a landing destination from the furthest point away from the landing destination expected to be reached during execution of the test deck 500), a following aircraft callsign 535, a pilot 540 for the following aircraft, a frequency 545 to "squawk" or broadcast, limits 550 for the test deck, operating parameters 555 of the aircraft, and/or a mission flow 560, which can indicate which test cards will be executed in the test deck. As shown in FIG. 5, the mission flow can also indicate the amounts 565 of fuel required to complete each test card.

Using an HMI 120, an operator can select the first test card by interacting with the arrow 570 on the screen showing the test deck 500.

Figure 6:
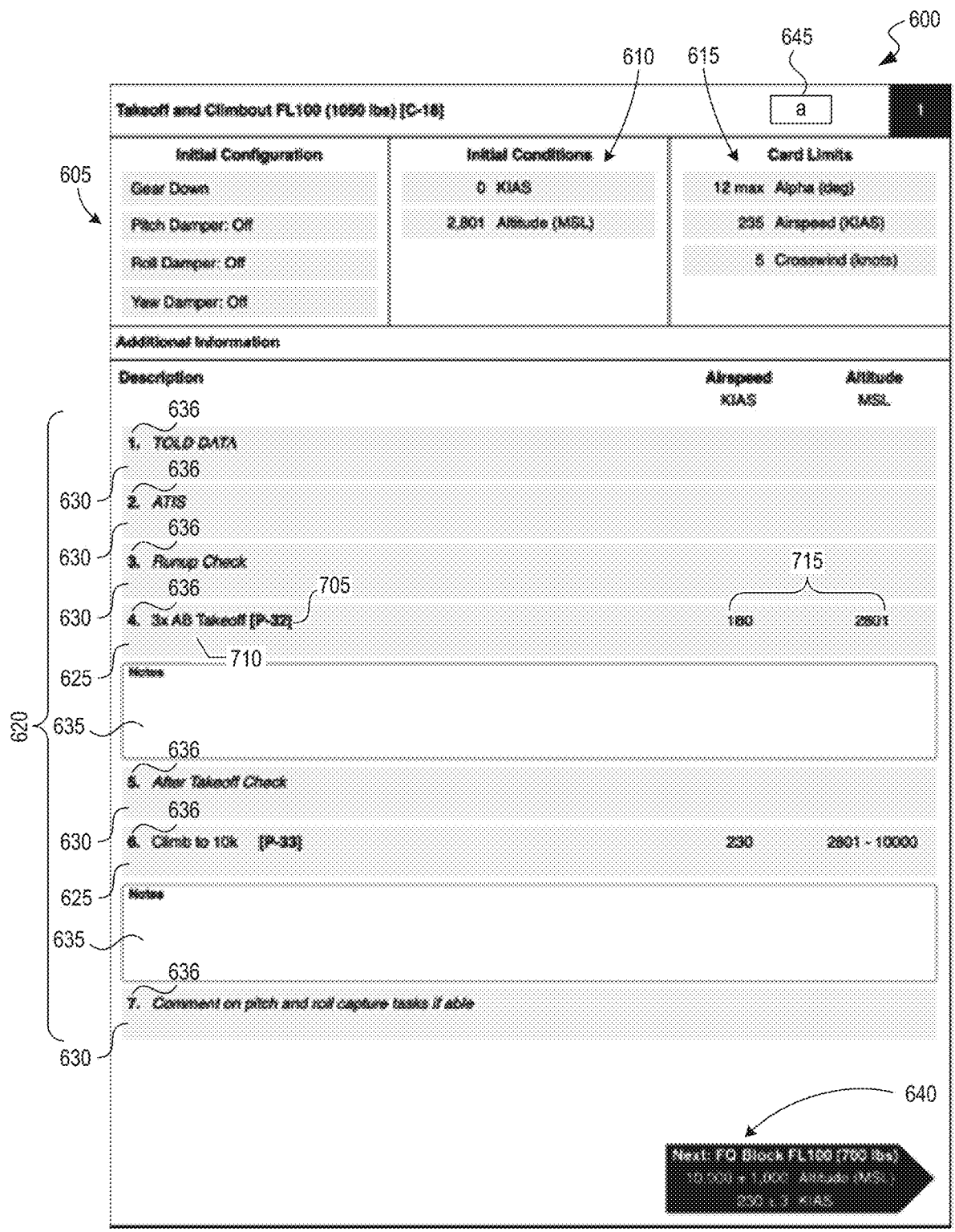
FIG. 6 is a representative diagram illustrating a test card according to representative embodiments of the present technology.

FIG. 6 illustrates a view of a graphical user interface associated with a representative test card 600 according to some embodiments of the present technology. In some embodiments, the test card 600 can include initial configurations 605 for various components of the aircraft to prepare the aircraft for executing the test card. For example, the initial configuration 605 can include landing gear settings, control surface settings, and/or other settings. In some embodiments, the test card 600 can include initial conditions 610 that define how the aircraft should be operating before initiating the test card 600. For example, the initial conditions 610 can include airspeed, altitude, and/or other conditions (in FIG. 6, the initial conditions are that the aircraft is stopped on the ground at an airfield). In some embodiments, the test card 600 can include limits 615 associated with execution of the test card 600. Limits can include airspeed, control surface settings, angle of attack, maximum environmental conditions (e.g., crosswind), and/or other limits for safety, test integrity, and/or other conditions.

The test card 600 can further include a sequential list 620 of test points 625, informational notices 630 (e.g., action items associated with the test points 625), and note prompts 635, which can include locations for an operator (e.g., a pilot and/or ground crew) to record observations and/or other comments. Accordingly, in some embodiments, the execution process 300 (described above) can further include receiving notes from an operator and associating the notes with one or more of the test points. In some embodiments, each item in the list 620 can include (e.g., can be labeled with) a sequential callout 636, which operators can use to quickly refer to items in the list 620 (e.g., via radio communications between a control room and flight crew, or other circumstances, such as "see test card 1, step 4").

In the illustrated test card 600, which is a non-limiting example, the test card informational notices 630 can include checking and/or gathering take-off and landing ("TOLD" data), checking the Automatic Terminal Information Service ("ATIS"), performing a runup check, performing an after-takeoff check, and/or commenting on tasks. The test points 625 can include takeoff (in the illustrated test card, afterburner "AB" takeoff is illustrated) and climb. The test points 625 can include altitude and/or airspeed associated with the action of the test point 625. The list 620 can include any suitable test points 625, informational notices 630, note prompts 635, and/or other elements associated with a test. In some embodiments, the test card 600 can include an indication 640 of the next test card in the test deck. The indication 640 can include an arrow interface for the pilot to move to the next test card (e.g., after completing the current card or to skip the current card), and/or a brief summary of the substance of the next test card. The operator can interact with the indication 640 using one or more of the HMIs 120. For example, the indication 640 can include initial conditions for the next test card for the pilot to set up for the next card. In some embodiments, the test card can indicate an amount of fuel necessary to complete the current and/or next test card.

In order to correlate telemetry data with the actions in the test card and/or the beginning or end of the operator's performance of the test card, in some embodiments, the computing system 100 captures timestamps associated with each action of the operator, such as interacting with the display of the card 600 (e.g., with the indication 640).

In some embodiments, the test card 600 can include one or more priority values 645. In some embodiments, the priority values can range from 0-100, or other suitable ranges. For example, a high-priority card (such as the takeoff card shown in FIG. 6, which is one example of a test card 600) can have a priority value greater than 95, such as 98 or 100, while a lower priority card can have a lesser priority value. In some embodiments, the the system 100 and the service 200 can include dropping (removing or skipping) lesser priority cards and keeping higher priority cards for execution. Accordingly, as mentioned above, in some embodiments, the test plan modification module 225 can select which test cards to remove from the test deck based on the expected fuel consumption values and/or the priority values 645.

Figure 7:
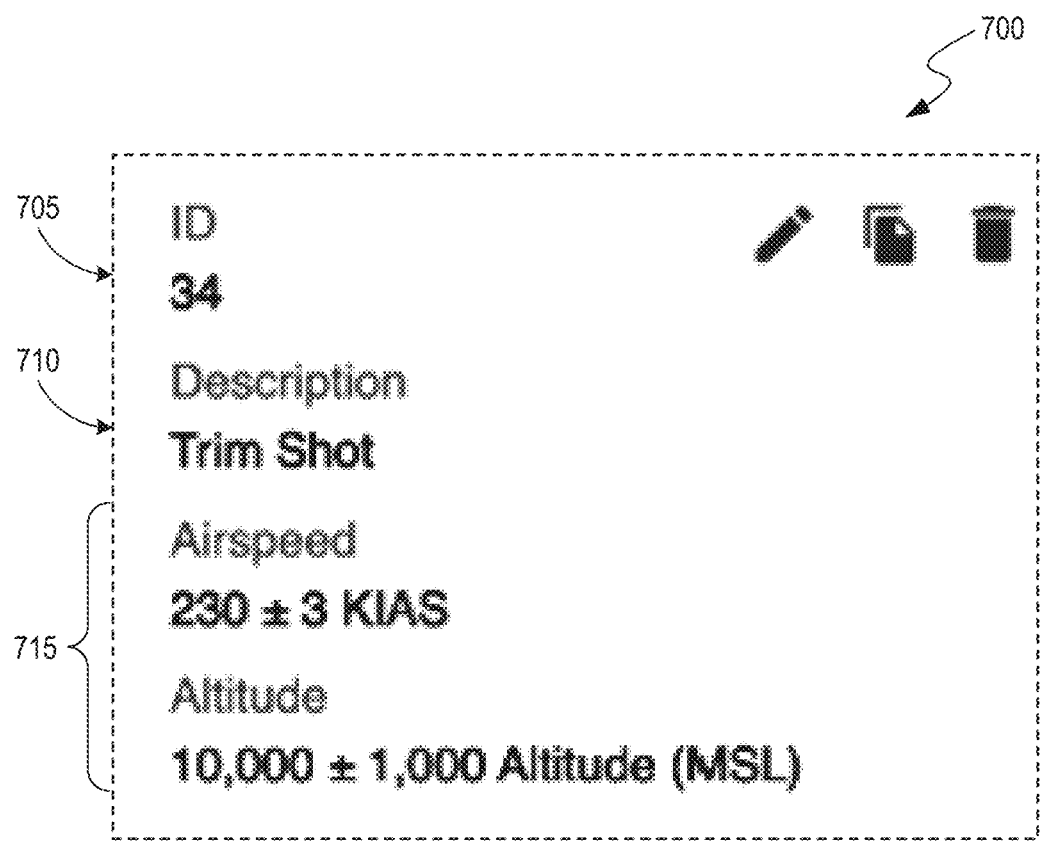
FIG. 7 is a representative diagram illustrating a test point according to representative embodiments of the present technology.

FIG. 7 is a diagram illustrating a representative test point 700 according to some embodiments of the present technology. The test point 700 in FIG. 7 is not from the test card 600 in FIG. 6, however, in some embodiments, the test point 700 can be implemented in the test card 600 in FIG. 6 depending on the desired nature of the test in the test card 600. In some embodiments, the test point 700 can be accessed by an operator by selecting one of the items in the sequential list 620 (see FIG. 6). The test point 700 can include a test point identification number 705, a description 710 of the test point 700, and test point limits 715 defining how the test point 700 can attain a passing status (i.e., the altitude and/or airspeed associated with the action of the test point 700). Systems and methods according to embodiments of the present technology can compare the test point limits 715 to data from the telemetry system of the aircraft to determine if the test point is passed. Possible statuses for the test point can further include executed, accepted, engineer accepted, engineer rejected, and passed. This assessment of the test point can be completed after the flight event as part of the data analysis process, and/or during the flight. In some embodiments, the assessment of the test point can be different from the data quality status described above.

Conclusion

While the foregoing technology is suitable for all types of aircraft, it may have particular applicability to high-speed aircraft, such as supersonic aircraft. As mentioned above, the described technology allows for rapid, automatic modifications to flight test plans for aircraft, which reduces the need for flight crew and test engineers to perform manual modifications to flight test plans. Manual modifications and fuel calculations can distract the flight crew and test engineers from critical data that can compromise the safety of the flight crew and/or the test engineers. Therefore, embodiments of the technology described herein reduce the number/impact of distractions that can be experienced by the flight crew and test engineers, which enables safer operation of the aircraft during the flight test. Moreover, embodiments of the present technology are also applicable to other vehicles, machines, and/or equipment. For example, embodiments of the present technology may be implemented to execute a test plan for ground vehicles and/or boats.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, although an "operator" can include a pilot, crewmember, and/or another human operator, in some embodiments, an "operator" can include a remote control pilot or operator and/or an autonomous system, such that embodiments of the present technology can be implemented in autonomous systems (e.g., an autonomous system can follow the test points).

While processes or blocks are presented in a given order, alternative embodiments may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or they may be performed at different times.

Further, any specific numbers noted herein are only examples: alternative embodiments may employ differing values or ranges. As used herein, the term "and/or" when used in the phrase "A and/or B" means "A, or B, or both A and B." A similar manner of interpretation applies to the term "and/or" when used in a list of more than two terms. To the extent any materials incorporated herein by reference conflict with the present disclosure, the present disclosure controls.

The foregoing and other changes can be made to the presently disclosed technology in light of the above Detailed Description, without departing from the scope of the present technology. While the above description describes certain examples of the disclosed technology, and describes the best mode contemplated, no matter how detailed the above appears in text, the disclosed technology can be practiced in many ways. Details of the service and method may vary considerably in their specific embodiments, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated.

Several additional aspects and/or embodiments of the present technology are set forth in the following examples, which can be combined with each other, and which may omit one or more elements. In general, the terms used in the following examples should not be construed to limit the disclosed technology to the specific examples disclosed in the specification, unless the above Detailed Description section explicitly defines such terms.

EXAMPLES

1. A method for testing an aircraft in-flight, the method comprising:
    receiving a test deck, the test deck including one or more test cards, with an individual test card of the one or more test cards including an ordered list of points for performing a test of the aircraft;
    for an individual test card:
        performing points of the ordered list of points;
        assigning a status to the performed points of the ordered list of points upon completion of the performed points;
        receiving a current fuel value for the aircraft;
        comparing the current fuel value to an expected amount of fuel required to perform the remaining test cards in the test deck; and
        in response to the comparison indicating that the current fuel value is not sufficient for the remaining test cards in the test deck:
            making one or more modifications to the test deck at least until the current fuel value is sufficient for executing a subset of remaining test cards in the test deck.

2. The method of example 1, wherein the ordered list of points are actions to be performed during a test flight of the aircraft.

3. The method of example 1, wherein the current fuel value for the aircraft is obtained from a telemetry system of the aircraft.

4. The method of example 1, further comprising:
    receiving a starting time for an individual point of the ordered list of points;
    receiving an ending time for the individual point of the ordered list of points; and
    associating data from a telemetry system of the aircraft with the individual point based on the starting time and ending time associated with the individual point.

5. The method of example 1, wherein an individual remaining test card includes an expected fuel consumption value for completing the remaining individual test card.

6. The method of example 5, wherein making the one or more modifications to the test deck includes:
    removing the individual remaining test card from the test deck based on the expected fuel consumption value for the individual remaining test card.

7. The method of example 1, wherein receiving the current fuel value for the aircraft includes determining the current fuel value based on sensor data indicating one or more weight parameters of the aircraft.

8. A computer-readable medium comprising instructions that, when executed by one or more processors, cause the one or more processors to perform a process, the process comprising:
    receiving a test deck, the test deck including one or more test cards, with an individual test card of the one or more test cards including an ordered list of points for performing a test of the aircraft;
    for an individual test card:
        performing points of the ordered list of points; and
        assigning a status to the performed points of the ordered list of points upon completion of the performed points;
        receiving a current fuel value for the aircraft;
        comparing the current fuel value to an expected amount of fuel required to perform the remaining test cards in the test deck; and
        in response to the comparison, indicating that the current fuel value is not sufficient for the remaining test cards in the test deck:
            making one or more modifications to the test deck at least until the current fuel value is sufficient for executing a subset of remaining test cards in the test deck.

9. The computer-readable medium of example 8, wherein the ordered list of points are actions to be performed during a test flight of the aircraft.

10. The computer-readable medium of example 8, wherein the current fuel value for the aircraft is obtained from a telemetry system of the aircraft.

11. The computer-readable medium of example 8, the process further comprising:
    receiving a starting time for an individual point of the ordered list of points;

receiving an ending time for the individual point of the ordered list of points; and associating data from a telemetry system of the aircraft with the individual point based on the starting time and ending time associated with the individual point.

12. The computer-readable medium of example 8, wherein an individual remaining test card includes an expected fuel consumption value for completing the remaining individual test card.

13. The computer-readable medium of example 12, wherein making the one or more modifications to the test deck includes:

removing the individual remaining test card from the test deck based on the expected fuel consumption value for the individual remaining test card.

14. The computer-readable medium of example 8, wherein receiving the current fuel value for the aircraft includes determining the current fuel value based on sensor data indicating one or more weight parameters of the aircraft.

15. A computing system comprising:

one or more processors; and a memory comprising instructions that, when executed by the one or more processors, cause the one or more processors to perform a process, the process comprising:

receiving a test deck, the test deck including one or more test cards, with an individual test card of the one or more test cards including an ordered list of points for performing a test of the aircraft;

for an individual test card:

performing points of the ordered list of points; and assigning a status to the performed points of the ordered list of points upon completion of the performed points;

receiving a current fuel value for the aircraft;

comparing the current fuel value to an expected amount of fuel required to perform the remaining test cards in the test deck; and in response to the comparison, indicating that the current fuel value is not sufficient for the remaining test cards in the test deck:

making one or more modifications to the test deck at least until the current fuel value is sufficient for executing a subset of remaining test cards in the test deck.

16. The computing system of example 15, wherein the ordered list of points are actions to be performed during a test flight of the aircraft.

17. The computing system of example 15, the process further comprising:

receiving a starting time for an individual point of the ordered list of points;

receiving an ending time for the individual point of the ordered list of points; and associating data from a telemetry system of the aircraft with the individual point based on the starting time and ending time associated with the individual point.

18. The computing system of example 15, wherein an individual remaining test card includes an expected fuel consumption value for completing the remaining individual test card.

19. The computing system of example 18, wherein making the one or more modifications to the test deck includes:

removing the individual remaining test card from the test deck based on the expected fuel consumption value for the individual remaining test card.

20. The computing system of example 15, wherein receiving the current fuel value for the aircraft includes determining the current fuel value based on sensor data indicating one or more weight parameters of the aircraft.

21. A method for testing an aircraft, the method comprising:

receiving, in a computer system, a test deck comprising a plurality of test cards, wherein an individual test card comprises one or more test points for performing a test of the aircraft, wherein individual test points comprise an action to perform with the aircraft; and performing a first one of the test cards, wherein performing the first one of the test cards comprises:

performing the one or more test points with the aircraft;

recording, in the computer system, telemetry data from the aircraft associated with performance of the one or more test points; and for each test point performed, after performing the test point, determining, with the computer system, a status of the test point, wherein the status represents a comparison between the telemetry data and one or more pre-set parameters of the test point.

22. The method of example 21, further comprising:

receiving, in the computer system, a current fuel value for the aircraft;

comparing, using the computer system, the current fuel value to an expected amount of fuel required to perform other test cards of the test deck;

in response to the comparison, using the computer system, determining that the current fuel value is not sufficient for performing the other test cards in the test deck; and removing or skipping, by the computer system, one or more of the other test cards in the test deck at least until the current fuel value is sufficient for executing a subset of the other test cards in the test deck.

23. The method of example 22, further comprising repeating the receiving the current fuel value, comparing the current fuel value to the expected amount of fuel, determining that the fuel value is not sufficient, and removing or skipping the one or more of the other test cards.

24. The method of example 22, or 23, further comprising determining, using the computer system, the expected amount of fuel required to perform the other test cards of the test deck.

25. The method of example 24, wherein determining the expected amount of fuel comprises analyzing, with the computer system, the test points in the other test cards to determine one or more flight patterns, and based on the one or more flight patterns, estimating the fuel that would be used in the one or more flight patterns.

26. The method of example 24, wherein determining the expected amount of fuel comprises, for each of the other test cards in the test deck, determining (a) an amount of fuel required to turn the aircraft until it is pointed at a landing destination based on a heading and airspeed before the turn and an estimated altitude, latitude, and longitude upon completion of the turn; (b) an amount of fuel required to fly to the landing destination at a suitable altitude to begin a landing procedure; (c) an amount of fuel required for flying a traffic pattern at the landing destination; (d) an amount of fuel required for a selected number of landing attempts at the landing destination; and/or (e) an amount of fuel required after a successful landing.

27. The method of any of examples 22-26, further comprising determining the current fuel value based on sensor data indicating one or more weight parameters of the aircraft.

28. The method of any one of examples 22-27, wherein receiving the current fuel value for the aircraft comprises receiving the current fuel value from a telemetry system of the aircraft.

29. The method of any of examples 21-28, wherein the one or more test points are first test points, and wherein the individual test card further comprises one or more additional test points, wherein the one or more additional test points comprise an initial configuration for the aircraft, and wherein the method further comprises configuring the aircraft according to each additional test point prior to performing the first test points.

30. The method of any of examples 21-29, further comprising:
    receiving, in the computer, a starting time for at least one of the test points;
    receiving, in the computer, an ending time for at least one of the test points; and
    using the computer, associating data from a telemetry system of the aircraft with the at least one of the test points based on the starting time and ending time.

31. The method of any of examples 21-30, wherein the action of at least one of the test points comprises taking off, climbing, or landing the aircraft.

32. The method of any of examples 21-31, further comprising receiving, in the computer, notes from an operator and associating the notes with at least one of the one or more test points.

33. A aerospace system comprising one or more controllers programmed with instructions that, when executed:
    receive a test deck comprising a plurality of test cards, wherein an individual test card comprises one or more test points for performing a test of the aerospace system, wherein individual test points define an action for an operator to perform with the aerospace system; and
    perform a first one of the test cards, wherein performing the first one of the test cards comprises:
        displaying the first one of the test cards to the operator;
        recording telemetry data from the aerospace system associated with performance of the one or more test points by the operator; and
        after each test point is performed, determining a status of the test point, wherein the status represents a comparison between the telemetry data and one or more pre-set parameters of the test point.

34. The system of example 33, wherein the one or more controllers are further programmed with instructions that, when executed:
    receive a current fuel value for the aerospace system;
    compare the current fuel value to an expected amount of fuel required to perform other test cards of the test deck;
    in response to the comparison, determine that the current fuel value is not sufficient for performing the other test cards in the test deck; and
    remove or skip one or more of the other test cards in the test deck at least until the current fuel value is sufficient for executing a subset of the other test cards in the test deck.

35. The system of example 34, wherein the one or more controllers are further programmed with instructions that, when executed:
    repeat the receiving the current fuel value, compare the current fuel value to the expected amount of fuel, determine that the fuel value is not sufficient, and then remove or skip the one or more of the other test cards.

36. The system of example 34 or 35, wherein the one or more controllers are further programmed with instructions that, when executed, determine the expected amount of fuel required to perform the other test cards of the test deck.

37. The system of example 36, wherein determining the expected amount of fuel comprises analyzing the test points in the other test cards to determine one or more flight patterns, and based on the one or more flight patterns, estimating fuel that would be used in the one or more flight patterns.

38. The system of example 36, wherein determining the expected amount of fuel comprises, for each of the other test cards in the test deck, determining (a) an amount of fuel required to operate an aircraft associated with the aerospace system until it is pointed at a landing destination based on a heading and airspeed before a turn and an estimated altitude, latitude, and longitude upon completion of the turn; (b) an amount of fuel required to fly to the landing destination at a suitable altitude to begin a landing procedure; (c) an amount of fuel required for flying a traffic pattern at the landing destination; (d) an amount of fuel required for a selected number of landing attempts at the landing destination; and/or (e) an amount of fuel required after a successful landing.

39. The system of example 34, wherein the one or more controllers are further programmed with instructions that, when executed, determine the current fuel value based on sensor data indicating one or more weight parameters of the aerospace system.

40. The system of any of examples 34-39, wherein receiving the current fuel value for the aerospace system comprises receiving the current fuel value from a telemetry system of the aerospace system.

41. The system of any of examples 33-40, wherein the one or more test points are first test points, and wherein the individual test card further comprises one or more additional test points, wherein the one or more additional test points comprise an initial configuration for the aerospace system, and wherein the one or more controllers are further programmed with instructions that, when executed, record the telemetry data associated with performance of the one or more test points only after receiving an indication that the aerospace system is configured according to each additional test point.

42. The system of any of examples 33-41, wherein the one or more controllers are further programmed with instructions that, when executed:
    receive a starting time for at least one of the test points;
    receive an ending time for at least one of the test points; and
    associate data from a telemetry system of the aerospace system with the at least one of the test points based on the starting time and ending time.

43. The system of any of examples 33-42, wherein the action of at least one of the test points comprises taking off, climbing, or landing the aerospace system.

44. The system of any of examples 33-43, wherein the one or more controllers are further programmed with instructions that, when executed, receive notes from an operator and associate the notes with at least one of the one or more test points.

45. A computer-readable medium comprising instructions that, when executed:
    display a first test card of a plurality of test cards to an operator of an aerospace system, the first test card comprising one or more test points for the operator to perform with the aerospace system;

receive a current fuel value for an aircraft of the aerospace system;

compare the current fuel value to an expected amount of fuel required to perform other test cards of the plurality of test cards;

in response to the comparison, determine that the current fuel value is not sufficient for performing the other test cards; and remove or skip one or more of the other test cards at least until the current fuel value is equal to, or greater than, an amount of fuel required for an operator to perform a subset of the other test cards of the plurality of test cards.

46. The computer-readable medium of example 45, further comprising instructions that, when executed:

record telemetry data from the aerospace system associated with the performance of the one or more test points; and after an individual test point of the one or more test points is performed, determine a status of the individual test point, wherein the status represents a comparison between the telemetry data and one or more pre-set parameters of the individual test point.

47. The computer-readable medium of example 45 or 46, further comprising instructions that, when executed, determine the expected amount of fuel required to perform the other test cards.

48. The computer-readable medium of example 47, wherein determining the expected amount of fuel comprises analyzing the test points in the other test cards to determine one or more flight patterns, and based on the one or more flight patterns, estimating fuel that would be used to complete the one or more flight patterns.

49. The computer-readable medium of example 47, wherein determining the expected amount of fuel comprises, for each of the other test cards, determining (a) an amount of fuel required to turn the aircraft until it is pointed at a landing destination based on a heading and airspeed before the turn and an estimated altitude, latitude, and longitude upon completion of the turn; (b) an amount of fuel required to fly to the landing destination at a suitable altitude to begin a landing procedure; (c) an amount of fuel required for flying a traffic pattern at the landing destination; (d) an amount of fuel required for a selected number of landing attempts at the landing destination; and/or (e) an amount of fuel required after a successful landing.

50. The computer-readable medium of any of examples 45-49, further comprising instructions that, when executed:

receive a starting time for at least one of the test points;
receive an ending time for at least one of the test points; and
associate data from a telemetry system of the aircraft with the at least one of the test points based on the starting time and ending time.

51. The computer-readable medium of any of examples 45-50, further comprising instructions that, when executed, receive notes from an operator and associate the notes with at least one of the one or more test points.

We claim:

1. A method for testing an aircraft, the method comprising:

receiving, in one or more databases, two or more groups of sequential test points for performing a test of the aircraft, wherein each individual test points comprises an action for one or more operators to perform with the aircraft during take-off, climb, cruise, or landing of the aircraft;

determining, with one or more processors, a required amount of fuel required to both (a) perform all of the groups of sequential test points and (b) perform at least one maneuver, wherein the at least one maneuver comprises turning the aircraft to point at a landing destination,
flying to the landing destination at a suitable altitude to begin a landing procedure,
flying a traffic pattern at the landing destination,
attempting one or more landings, or
taxiing after landing;

for each of one or more first groups of sequential test points of the two or more groups of sequential test points:

(i) displaying, on a display of the aircraft, to the one or more operators, each test point, in sequence;
(ii) performing, by the one or more operators, with the aircraft, the action of each test point, in sequence;
(iii) generating, with one or more first sensors, telemetry data corresponding to performance of at least one of the actions; and
(iv) receiving and recording the telemetry data in the one or more databases; then determining, with the one or more processors in communication with one or more second sensors carried by the aircraft, a current amount of fuel for the aircraft, receiving, in the one or more databases, the current amount of fuel:

comparing using the one or more processors, the current amount of fuel to the required amount of fuel;

in response to the comparing, determining, with the one or more processors that the current amount of fuel is insufficient to perform one or more second groups of sequential test points of the two or more groups of sequential test points; and in response to determining that the current amount of fuel is insufficient to perform the one or more second groups of sequential test points, repeatedly skipping, with the one or more processors, one or more of the second groups of sequential test points until the one or more processors determine that the current amount of fuel is sufficient for performing a subset of the groups of sequential test points.

2. The method of claim 1, wherein determining the required amount of fuel comprises analyzing, with the one or more processors, the test points in the other groups of test points to determine one or more flight patterns, and based on the one or more flight patterns, estimating the fuel that would be used in the one or more flight patterns.

3. The method of claim 1, wherein for each group of the two or more groups of sequential test points, at least one of the test points comprises an initial configuration for the aircraft, and wherein the method further comprises configuring the aircraft according to the initial configuration prior to performing other test points in the group.

4. The method of claim 1, further comprising:

receiving, in the processor, a starting time for at least one of the test points;
receiving, in the processor, an ending time for at least one of the test points; and
using the processor, associating the telemetry data with at least one of the test points based on the starting time and ending time.

5. The method of claim 1, wherein the action of at least one of the test points comprises manipulating control surfaces and/or a throttle.

6. The method of claim 1, further comprising receiving input from the one or more operators associated with at least one of the test points and recording the input in the one or more databases.

7. An aircraft carrying a propulsion system and one or more controllers programmed with instructions that, when executed:
receive, in one or more databases, three or more groups of test points for testing the aircraft, wherein individual test points define an action for one or more operators to perform with the aircraft;
display, to the one or more operators, on a display carried by the aircraft, one or more of the test points in a first one of the groups of test points;
in response to the one or more operators performing the one or more of the test points in the first one of the groups of test points, record telemetry data from the aircraft associated with performance of the one or more test points in the first one of the groups of test points;
after the performance of the one or more test points in the first one of the of test points, determine a status of the one or more test points in the first one of the groups of test points, wherein the status represents a comparison between the telemetry data and one or more pre-set parameters;
after performance of all of the test points in the first one of the groups of test points receive from one or more sensors, a current amount of fuel for the aircraft;
determine whether the current amount of fuel is greater than a required amount of fuel required to perform a second one of the groups of test points and one or more additional actions with the aircraft, and
in response to the determination:
(a) if the current amount of fuel is greater than the required amount of fuel display, to the one or more operators, on the display one or more of the test points in the second one of the groups of test points; or
(b) if the current amount of fuel is less than the required amount of fuel display, to the one or more operators, on the display, one or more of the test points in a third one of the groups of test points.

8. The aircraft of claim 7, wherein the one or more controllers are further programmed with instructions that, when executed, repeat a routine of:
displaying a subsequent group of test points on a display;
in response to the one or more operators performing the test points in the subsequent group of test points, determine whether a subsequent amount of fuel is greater than a subsequent required amount of fuel required to perform another subsequent group of test points and one or more additional actions with the aircraft; and
in response to determining that the required subsequent amount of fuel is less than the subsequent amount of fuel, skipping the another subsequent group of test points until the required subsequent amount of fuel is greater than or equal to the subsequent amount of fuel.

9. The aircraft of claim 7, wherein the one or more controllers are further programmed with instructions that, when executed, determine the required amount of fuel required to perform all of the groups of test points.

10. The aircraft of claim 9, wherein the determining the required amount of fuel comprises analyzing the test points in the second one of the groups of test points to determine one or more flight patterns, and based on the one or more flight patterns, estimating fuel that would be used in the one or more flight patterns.

11. The aircraft of claim 7, wherein the one or more additional actions with the aircraft comprises: (a) operating the aircraft until the aircraft is pointed at a landing destination based on a heading and airspeed before a turn and an estimated altitude, latitude, and longitude upon completion of the turn; (b) flying to the landing destination at a suitable altitude to begin a landing procedure; (c) flying a traffic pattern at the landing destination; (d) attempting one or more landings at the landing destination; and/or (e) taxiing.

12. The aircraft of claim 7, wherein the one or more sensors indicate one or more weight parameters of the aircraft.

13. The aircraft of claim 7, wherein at least one of the test points comprises an initial configuration for the aircraft, and wherein the one or more controllers are further programmed with instructions that, when executed, record the telemetry data associated with performance of the one or more test points only after receiving an indication that the aircraft is configured according to the at least one of the test points.

14. The aircraft of claim 7, wherein the one or more controllers are further programmed with instructions that, when executed:
receive a starting time for at least one of the test points;
receive an ending time for at least one of the test points; and
associate telemetry data of the aircraft with the at least one of the test points based on the starting time and ending time.

15. The aircraft of claim 7, wherein the action of at least one of the test points comprises taking off, climbing, or landing the aircraft.

16. The aircraft of claim 7, wherein the one or more controllers are further programmed with instructions that, when executed, receive notes from the one or more operators and associate the notes with at least one of the test points.

17. A non-transitory computer-readable medium comprising instructions that, when executed:
cause a display in an aircraft to display a first group of test points of a plurality of groups of test points to one or more operators of the aircraft, wherein each test point comprises an action for the one or more operators to perform with the aircraft, and wherein the instructions retrieve the test points from a database;
receive from a sensor onboard the aircraft or a controller onboard the aircraft a current amount of fuel in the aircraft;
compare the current amount of fuel to an expected amount of fuel required to perform other groups of test points;
in response to the comparison, determine that the current amount of fuel is not sufficient for the one or more operators to perform the other groups of test points; and
remove or skip one or more of the other groups of test points at least until the current amount of fuel is equal to, or greater than, an amount of fuel required for the one or more operators to perform a subset of the other groups of test points.

18. The non-transitory computer-readable medium of claim 17, further comprising instructions that, when executed:
record telemetry data from the aircraft associated with performance of the each test points by the aircraft; and
for each test point, after performance of the test point, determine a status of the test point, wherein the status represents a comparison between the telemetry data and one or more pre-set parameters of the test point.

19. The non-transitory computer-readable medium of claim 17, further comprising instructions that, when executed, determine the expected amount of fuel required to perform one or more of the other groups of test points.

20. The non-transitory computer-readable medium of claim 19, wherein determining the expected amount of fuel comprises analyzing the test points in the one or more other groups of test points to determine one or more flight patterns, and based on the one or more flight patterns, estimating fuel that would be required to complete the one or more flight patterns.

21. The non-transitory computer-readable medium of claim 19, wherein determining the expected amount of fuel comprises, for each of the other groups of test points, determining (a) an amount of fuel required to turn the aircraft until it is pointed at a landing destination based on a heading and airspeed before the turn and an estimated altitude, latitude, and longitude upon completion of the turn; (b) an amount of fuel required to fly to the landing destination at a suitable altitude to begin a landing procedure; (c) an amount of fuel required for flying a traffic pattern at the landing destination; (d) an amount of fuel required for a selected number of landing attempts at the landing destination; and/or (e) an amount of fuel required after a successful landing.

22. The non-transitory computer-readable medium of claim 17, further comprising instructions that, when executed:
receive a starting time for at least one of the test points;
receive an ending time for at least one of the test points; and
associate data from a telemetry system of the aircraft with the at least one of the test points based on the starting time and ending time.

23. The non-transitory computer-readable medium of claim 17, further comprising instructions that, when executed, receive notes from an operator and associate the notes with at least one of the test points.

* * * * *